US005746838A

United States Patent [19]

Huth

[11] Patent Number: 5,746,838

[45] Date of Patent: May 5, 1998

[54] ENZYME COMPOSITIONS AND METHODS FOR CONTACT LENS CLEANING

[75] Inventor: Stanley W. Huth, Newport Beach, Calif.

[73] Assignee: Allergan, Waco, Tex.

[21] Appl. No.: 755,801

[22] Filed: Nov. 22, 1996

Related U.S. Application Data

[62] Division of Ser. No. 673,993, Jul. 1, 1996, Pat. No. 5,630,884, which is a division of Ser. No. 343,284, Nov. 22, 1994, abandoned, which is a continuation of Ser. No. 79,195, Jun. 17, 1993, abandoned.

[51] Int. Cl.$^6$ .................................. B08B 3/08; C12S 9/00

[52] U.S. Cl. .............................. 134/27; 134/28; 134/901; 514/839; 514/840; 435/184

[58] Field of Search ................................ 134/27, 28, 901; 514/839, 840; 435/184, 219; 510/114

[56] References Cited

U.S. PATENT DOCUMENTS

| | | |
|---|---|---|
| Re. 32,672 | 5/1988 | Huth et al. . |
| 3,676,374 | 7/1972 | Zaki et al. . |
| 3,746,649 | 7/1973 | Barrett, Jr. . |
| 3,771,989 | 11/1973 | Pera et al. . |
| 3,801,463 | 4/1974 | Eygermans . |
| 3,910,296 | 10/1975 | Karageozian et al. . |
| 3,912,451 | 10/1975 | Gaglia, Jr. . |
| 4,029,817 | 6/1977 | Blanco et al. . |
| 4,168,112 | 9/1979 | Ellis et al. . |
| 4,250,269 | 2/1981 | Buckman et al. . |
| 4,285,738 | 8/1981 | Ogata . |
| 4,304,894 | 12/1981 | Andrews et al. . |
| 4,413,429 | 11/1983 | Smith et al. . |
| 4,499,077 | 2/1985 | Stockel et al. . |
| 4,521,254 | 6/1985 | Anderson et al. . |
| 4,525,345 | 6/1985 | Stark . |
| 4,532,128 | 7/1985 | Sheldon et al. . |
| 4,568,517 | 2/1986 | Kaspar et al. . |
| 4,609,493 | 9/1986 | Schafer . |
| 4,614,549 | 9/1986 | Ogunbiyi et al. . |
| 4,615,882 | 10/1986 | Stockel . |
| 4,654,208 | 3/1987 | Stockel et al. . |
| 4,670,178 | 6/1987 | Huth et al. . |
| 4,690,773 | 9/1987 | Ogunbiyi et al. . |
| 4,767,559 | 8/1988 | Kruse et al. . |
| 4,783,483 | 11/1988 | Ogunbiyi et al. . |
| 4,786,436 | 11/1988 | Ogunbiyi et al. . |
| 4,836,956 | 6/1989 | Ogunbiyi et al. . |
| 5,096,607 | 3/1992 | Mowrey-McKee et al. . |
| 5,145,643 | 9/1992 | Dziabo et al. . |
| 5,281,277 | 1/1994 | Nakagawe et al. . |
| 5,281,353 | 1/1994 | Park et al. . |
| 5,318,717 | 6/1994 | Schafer . |

FOREIGN PATENT DOCUMENTS

| | | |
|---|---|---|
| 0257821 | 3/1988 | European Pat. Off. . |
| 0364666 | 8/1990 | European Pat. Off. . |
| 0420598A2 | 3/1991 | European Pat. Off. . |
| 0420600A2 | 3/1991 | European Pat. Off. . |
| 0456467 | 11/1991 | European Pat. Off. . |
| 0486467 | 11/1991 | European Pat. Off. . |
| 0093784 | 11/1993 | European Pat. Off. . |
| 63-131124 | 4/1988 | Japan . |
| 2117534 | 10/1983 | United Kingdom . |
| 2139260A | 11/1984 | United Kingdom . |
| WO850324 | 8/1985 | WIPO . |
| WO8805073 | 7/1988 | WIPO . |
| 8911878 | 12/1989 | WIPO . |
| WO9010072 | 7/1990 | WIPO . |
| WO92/15334 | 9/1992 | WIPO . |

OTHER PUBLICATIONS

Hall et al, Archives of Biochemistry & BioPhysics 114, pp. 147–153 (1966).

"Engineering Enzme Activity Proves Prolific", Science/Technology, pp. 30–32, Sep. 17, 1990.

Morishita et al, "Novel oral microspheres of insulin with protease inhibitor protecting from enzymatic degradation" International Journal of Pharmaceutics, 78(1992)1–7.

Morishita et al, "Hypoglycemic effect of novel oral microspheres of insulin with protease inhibitor in normal and diabetic rats", Int. Journal of Phar., 78(1992)9–16.

The Buckman Toxicity Profile.

The Buckman Technical Specifications.

The Buckman Material Safety Data Sheet.

The Lens Care Research Bulletin Bausch and Lomb.

The Croda, Inc. Bulletin—Crodacel Q (L,M&S).

The Croda, Inc. Bulletin—Crodacel L.

The Croda, Inc. Material Safety Data Sheet (lauroyl quaternized hydroxyethyl cellulose).

The Croda, Inc. Material Safety Data Sheet (cocoyl quaternized hydroxyethyl cellulose).

The Croda, Inc. Material Safety Data Sheet (stearoyl quaternized hydroxyethyl cellulose).

*Primary Examiner*—Jeffrey Snay
*Attorney, Agent, or Firm*—Frank J. Uxa

[57] ABSTRACT

Enzyme compositions and methods employing enzyme compositions are disclosed which are useful for cleaning contact lenses. In one embodiment, a composition in accordance with the present invention comprises an enzyme component effective when released in a liquid medium to remove debris from a contact lens located in the liquid medium; and an activity regulating component effective when released in the liquid medium to deactivate the enzyme component located in the liquid medium. This composition is preferably structured so that the enzyme component is released in the liquid medium before the activity regulating component is so released. The period of time between the release of the enzyme component and the activity regulating component is sufficient to allow the enzyme component to effectively remove debris from a contact lens which is introduced into the liquid medium before or at the same time the enzyme component is released in the liquid medium.

15 Claims, No Drawings

ENZYME COMPOSITIONS AND METHODS FOR CONTACT LENS CLEANING

This is a division of application Ser. No. 08/673,993, filed Jul. 1, 1996, now U.S. Pat. No. 5,630,884, which, in turn, is a division of application Ser. No. 08/343,284 filed Nov. 22, 1994, now abandoned, which, in turn, is a continuation of application Ser. No. 08/079,195, filed Jun. 17, 1993, now abandoned.

BACKGROUND OF THE INVENTION

The present invention relates to enzyme-containing compositions and methods employing such enzyme-containing compositions for contact lens cleaning. More particularly, the invention relates to such enzyme-containing compositions and to contact lens cleaning methods employing enzyme-containing compositions which provide for deactivating the enzyme after the contact lens has been effectively enzymatically cleaned.

The growth of the contact lens industry has led to a dramatic increase in the number of contact lens care systems. One goal of the lens care industry has been to simplify lens care systems while, at the same time, providing for effective, high quality care, and safe and comfortable wearing of the treated contact lenses.

In the normal course of wearing contact lenses, debris, such as tear film and proteinaceous, oily, sebaceous and related organic matter, has a tendency to deposit and build up on the lens surface. As part of the routine care of a contact lens, it should be cleaned to remove this debris. If this debris is not removed, the lens can become uncomfortable to wear and may even damage the eye.

One approach to removing debris buildup from contact lenses has been to subject the debris laden lenses to enzymatic action. For example, Karageozian U.S. Pat. No. 3,910,296 discloses the use of proteases for cleaning contact lenses.

Ogata U.S. Pat. No. 4,285,738 discloses the use of compositions comprising urea and/or an acid salt of guanidine, a reducing agent and a proteolytic enzyme, with or without additionally heating, to clean contact lenses. Proteolytic enzymes disclosed include papain, trypsin, alpha-chymotrypsin, pronase p from *S. griseus* and proteinase from *B. subtilis.*

Anderson U.S. Pat. No. 4,521,254 discloses methods and compositions for cleaning contact lenses comprising an endopeptidase such as bromelain and a carboxy peptidase enzyme.

Schaefer U.S. Pat. No. 4,609,493 discloses contact lens cleaning compositions containing a proteolytic enzyme, an anionic surfactant, a calcium chelating agent and urea. The calcium chelating agent is disclosed as a principal lens cleaning ingredient which does not significantly decrease the activity of the enzyme. Preferred enzymes are pancreatin and papain.

Ogunbiyi U.S. Pat. No. 4,614,549 discloses methods for cleaning and thermally disinfecting contact lenses and deactivating the enzymes used for this process through the use of proteolytic enzymes in aqueous solutions which are heated to an elevated temperature between 60° C. and 100° C.

Ogunbiyi U.S. Pat. No. 4,614,549 discloses the use of activator-free microbial-derived proteolytic enzymes as well as chelating agents such as salts of ethylene diamine tetraacetate (EDTA) to bind metal ions in solution such as calcium, which might otherwise react with lens protein and collect on lens surfaces.

Ogunbiyi U.S. Pat. No. 4,690,773 discloses methods for cleaning contact lenses with an activator-free enzyme solution comprising an aqueous solution containing a protease derived from a Bacillus, Streptomyces or Aspergillus microorganism. The microbial proteases disclosed require no additional activators or stabilizers and are not inhibited when in the presence of a chelating agent. This patent discloses that enzymes which are inhibited by chelating agents are generally unsatisfactory for use with contact lenses. Also, this patent discloses that proteases should be active at a pH range of from 5 to 8.5.

Huth et al U.S. Pat. No. Reissue 32,672 discloses methods for simultaneous cleaning and disinfecting of contact lenses using a disinfecting amount of peroxide and peroxide-active enzymes. Neutral, acidic or alkaline enzymes, as well as metallo-proteases, may be used.

Mowrey-McKee U.S. Pat. No. 5,096,607 discloses methods for simultaneously cleaning and disinfecting contact lenses using polymeric quaternary ammonium salts or biguanides, a proteolytic enzyme and an aqueous system wherein the osmotic value is adjusted to a level which does not substantially inhibit the activity of the antimicrobial agent. This patent discloses that additional components, such as chelating and/or sequestering agents, may be added to or incorporated into the enzyme which do not substantially decrease the activity of the enzyme.

None of the aforementioned patents discloses methods or compositions to inactivate cleaning enzymes via ionic regulators in the absence of heat input.

An important concern relating to the enzymatic cleaning systems currently being employed is the need to remove the enzyme from the lens prior to placing the cleaned lens in the eye. Placing a lens contaminated with cleaning enzyme into the eye may be potentially detrimental to the eye. This potential problem, if any, is avoided currently by rinsing the contact lens free of cleaning enzyme prior to placing the cleaned lens in the eye. However, this rinsing step may adversely impact user compliance since the user may consider such rinsing unnecessary and, as a result, place active enzyme in the eye. Additionally, in some instances, rinsing the contact lens free of cleaning enzyme may be insufficient to eliminate discomfort, irritation and detrimental ocular effects due to lens-bound active enzyme which may desorb or elute from the contact lens into the eye.

An additional concern relating to the enzymatic cleaning systems currently employed is that the lenses are often rubbed between the thumb and forefinger or in the palm of the hand, to remove the loosely adherent debris still remaining on the contact lens. Rubbing lenses often causes tearing and thus loss of the lens. The amount of debris remaining on the lenses is related to the cleaning efficiency of the enzyme composition which, in turn, is related to the concentration of enzyme employed. Current enzyme compositions must utilize lower concentrations of enzyme to avoid possible ocular surface damage if they are placed into the eyes. It would be advantageous to provide a system in which the lens is effectively cleaned without such rubbing.

SUMMARY OF THE INVENTION

New contact lens treatment systems have been discovered. The present systems involve the use of enzymes, preferably faster and/or more efficient enzymes and enzyme-containing formulations, to clean contact lenses while reducing, and even eliminating, the risks of rubbing lenses and also placing active cleaning enzyme in the eye. Further, the present systems may not require rubbing and/or rinsing the cleaned contact lens prior to placing the lens in the eye. In other words, in one embodiment the cleaned contact lens is suitable to be taken directly from the enzyme-containing liquid medium, in which the enzymatic cleaning takes place, and placed in the eye for safe and comfortable wear without risking damaging the lens or placing a damaging amount of active cleaning enzyme in the eye. The present invention takes advantage of activity regulating components which control the level of activity of various contact lens cleaning enzymes. Thus, by controlling the activity regulating components to which the enzymes are exposed, effective enzymatic cleaning of the contact lens can be obtained, and then the enzymes can be effectively deactivated so as to render the enzymes inactive, and preferably substantially innocuous, for example, in the environment present in the eye. The present systems are relatively easy to manufacture, often include conventional and commercially available components, and are very easy to use, providing for good user compliance. In addition, the present systems can include components effective to disinfect contact lenses, for example, while the lenses are being enzymatically cleaned. Such "one step" systems for the cleaning and disinfecting of contact lenses are not only effective, but also are very convenient and easy to use, thus further enhancing user compliance.

In one broad aspect of the present invention, compositions useful for cleaning contact lenses are provided and comprise an enzyme component and an activity regulating component. The enzyme component is present in an amount effective when released in a liquid medium to remove debris from a contact lens located in the liquid medium. The activity regulating component, preferably an ionic and/or inorganic activity regulating component and/or a metal chelating activity regulating component, is present in an amount effective when released in the liquid medium to deactivate the enzyme component located in the liquid medium. In one embodiment, such compositions may be, and preferably are, structured so that the enzyme component is released in the liquid medium a period of time before the activity regulating component is released in the liquid medium. This period of time is sufficient to allow the enzymatic component to effectively remove debris, preferably to completely remove at least one type of debris, from a contact lens which is introduced into the liquid medium before or at the same time the enzyme component is released in the liquid medium. Alternately, the enzyme component may be released in the liquid medium at about the same time as the activity regulating component. In this embodiment, the interaction/reaction between the activity regulating component and the enzyme component can take place while the enzyme component is removing debris from the contact lens and is slow enough to allow sufficient lens cleaning, debris removal, to take place prior to or simultaneously with enzyme component deactivation.

Using the compositions as described herein, one can remove the cleaned contact lens from the liquid medium after the activity regulating component has deactivated the enzyme component, and safely place the contact lens in the eye with or without intermediate rubbing and/or rinsing steps. More potent enzyme components and/or greater amounts of enzyme components than are conventionally employed to clean a contact lens can be satisfactorily and safely used in accordance with the present invention, thereby eliminating the need for a separate contact lens rubbing step. Amounts of enzyme component equal to at least about 200% or at least about 400% or more (based on enzymatic activity) of the amount of enzyme component conventionally employed may be used.

The present methods for cleaning contact lenses can employ compositions as described herein. For example, in one embodiment such methods comprise introducing a contact lens into a liquid medium, and introducing a composition, as described above, into the liquid medium. The contact lens is preferably introduced into the liquid medium at substantially the same time as the composition is introduced into the liquid medium. The present methods provide effectively cleaned contact lenses which may be placed in the eye directly from the liquid medium for safe and comfortable wear.

In one very useful embodiment, the liquid medium includes a disinfectant component in an amount effective to disinfect the contact lens located in the liquid medium. In this embodiment, the contact lens is both cleaned and disinfected. Such "one-step" cleaning and disinfecting systems are effective and easy for the contact lens wearer to use.

DETAILED DESCRIPTION OF THE INVENTION

The present invention can be used with all contact lenses such as conventional hard, soft, rigid gas permeable, and silicone lenses. The invention is preferably employed with soft lenses, such as those commonly referred to as hydrogel lenses prepared from monomers, such as hydroxyethylmethacrylate, vinylpyrrolidone, glycerylmethacrylate, methacrylic acid or acid esters and the like. Hydrogel lenses typically absorb significant amounts of water, such as in the range of about 38 to about 80 percent by weight or more.

The present invention generally employs an effective amount of enzyme component to remove debris from a contact lens. Among the types of debris that form on a contact lens during normal use are protein-based debris, mucin-based debris, lipid-based debris and carbohydrate-based debris. One or more types of debris may be present on a single contact lens.

The specific amount of enzyme component employed depends on several factors including, for example, the particular enzyme or enzymes employed, the activity of the enzyme or enzymes, the purity of the enzyme, the amount and type of debris deposited on the lens, the desired soaking period, the nature and concentration of the disinfecting agent if any, the specific type of lenses, as well as other well known factors.

The liquid medium preferably should contain sufficient enzyme to provide between about 0.0001 to 0.5 Anson units of activity per single lens treatment, more preferably between 0.0010 and 0.05, and still more preferably between 0.0020 and 0.020, Anson units per single lens treatment, in 1 to 10 ml of liquid medium. The precise amount of enzyme on a weight per unit volume of liquid medium basis depends, for example, on the purity of the enzyme and may need to be finally determined on a lot-by-lot basis.

The activity regulating component is present in an amount effective when released in the liquid medium containing the enzyme component to deactivate the enzyme component. Of course, the activity regulating component should be chosen to deactivate the specific enzyme component being employed. One activity regulating component may be effective against one or more of certain enzymes while not being effective against other enzymes. Thus, it is important that the proper enzyme component/activity regulating component couple be chosen. In addition, the activity regulating component should be chosen so as to have no substantial detrimental effect on the lens being treated or on the eyes of the wearer of the treated contact lens.

Various specific classes of enzyme component/activity regulating component couples are described in detail herein. However, it should be noted that the scope of the present invention is such as to provide, in general, for the deactivation of a contact lens cleaning enzyme component in the liquid medium containing the contact lens during and/or after contact lens cleaning. In this manner, the cleaned contact lens can be removed from this deactivated enzyme-containing liquid medium and placed directly in the eye of the contact lens wearer for safe and comfortable wear. Little or no risk of lens damage from rubbing or of ocular surface damage from the active enzyme component exists. The scope of the present invention also includes enzyme components which can be inactivated by the activity regulating components present in the eye. For example, an acid-acting protease active only at a pH less than about 6 may be employed together with a disinfecting agent in a weakly acid buffered solution to simultaneously clean and disinfect contact lenses. After such cleaning and disinfecting, the lenses may be placed directly into the eyes without rinsing the acid-acting protease from the lenses. In this embodiment, the naturally occurring pH buffers in the eye quickly raise the pH to a value above 6, which decrease in acidity inactivates the acid-acting protease.

In one embodiment, the enzyme component/activity regulating component couple is chosen so that the activity regulating component comprises an ionic and/or inorganic component and/or a metal chelating component in an amount effective to inactivate the enzyme component.

In one embodiment, the enzyme component/ionic and/or inorganic activity regulating component (IIARC) couple is chosen so that the enzyme component comprises an acid-acting enzyme and the IIARC, preferably comprising hydroxyl ions, is effective to change, for example, reduce, the acidity of a liquid medium containing the acid-acting enzyme to a level at which the acid acting enzyme is substantially inactive. This "inactive" level of acidity is preferably in the pH range of about 6.0 to about 8.5, which approximately corresponds to the physiological pH range for humans. Thus, after the acid-acting enzyme component has been deactivated, the cleaned contact lens can be removed from the liquid medium, which now has a physiologically acceptable. pH, and placed directly into the eye for safe and comfortable wear. Alternatively, the cleaned contact lens, including residual acid-acting enzyme component-containing liquid medium may be placed directly into the eye, provided that the liquid medium is weakly acid buffered. In this instance, the naturally occurring pH buffers in the eye quickly re-adjust the pH to a level above about 6.0 and, thus, substantially inactivate the acid-acting enzyme.

Various acid-acting enzymes may be employed. Preferably, the enzyme component is effective at a pH in the range of about 2 to about 5, more preferably about 3 to about 5. Specific examples of acid-acting enzymes which may be employed in the present invention include pepsin, gastricsin, chymosin (rennin), cathepsin D, genetically engineered enzymes, such as subtilisins, with acid pH activity profiles, rhizopus chinensis acid protease, protease B isolated from *Scytalidium lignicolum* (ATCC 24568) and *Lentinus edodes* TMI-563, acid proteases isolated from *Ganoderna lucidum* IFO4912, *Pleurotus cornucopia, Pleurotus astreatus* IFO 7051, *Flammulina velutipes* IFO 7046 and *Lintinus edodes* IFO 4902, acid proteases isolated from cells and in the culture medium of *Sulfolobus acidocaldarius* (thermopsin), *Sulfolobus solataricus* and *Thermoplasma acidophilum*, penicillium roqueforti acid protease, fungal acid proteases such a penicillopepsin from *Penicillium janthinellum*, aspergillopeptidase A from *Aspergillus saitoi*, endothia acid protease from *Endothia parasitin*, mucor rennins from *Mucor michei*, and the like and mixtures thereof.

If the enzyme component is acid acting, an acidity adjusting component is chosen to provide the activity regulating component, for example, hydroxyl ions. The acidity adjusting component may be selected, for example, from bases (basic components), basic salts, basic buffers, and mixtures thereof, more preferably from basic buffers and mixtures thereof. Specific examples of useful acidity adjusting components include those which are ophthalmically acceptable at physiologically compatible pHs. A material is ophthalmically acceptable if it can be placed in the eye without causing any significant detrimental effect on the eye. Examples of useful acidity adjusting components include alkali metal hydroxides, alkali metal carbonates, alkaline metal bicarbonates, alkaline earth metal hydroxides, alkaline earth metal carbonates, alkaline earth metal bicarbonates, borates, sodium and potassium phosphates, amino acid buffers and the like and mixtures thereof. The amount of acidity adjusting component used in the present invention is such as to provide sufficient activity regulating component to render the acidity of the liquid medium sufficiently reduced so that the acid-acting enzyme component is substantially inactive.

In one useful embodiment, the acid-acting enzyme component/IIARC couple is included with an acidity increasing component in an amount effective when released in the liquid medium to increase the acidity of the liquid medium to a level at which the acid-acting enzyme is active. The above-noted couple and acidity increasing component are preferably present in a composition which is structured to release the acidity increasing component before or at about the same time the acid-acting enzyme is released in the liquid medium. In this embodiment, the liquid medium, which may have a pH in the range of about 6.5 to about 8, is subjected to the action of the acidity increasing component, which increases the acidity of the liquid medium, preferably to a pH in the range of about 2 or about 3 to about 5. The acid-acting enzyme component then effectively cleans the contact lens. After this cleaning has occurred, the acidity adjusting component is released in the liquid medium to provide activity regulating component to reduce the acidity of the liquid medium, preferably to a pH in the range of about 6 to about 8.5. In this manner, the acidity of the liquid medium is controlled to effectively clean the contact lens and then to effectively inactivate or deactivate the acid-acting enzyme component.

Examples of useful acidity increasing components include acids (acidic components), acid salts, acidic buffers and mixtures thereof, preferably acidic buffers and mixtures thereof. Examples of useful acidic increasing components include hydrochloric acid, boric acid, tartaric acid, citric acid and mixtures thereof.

The amount of acidity increasing component employed in the present invention is such as to increase the acidity of the liquid medium being employed to a level at which the enzyme component is active. The specific amounts of acidity increasing component vary depending upon the specific acidity increasing component employed, the amount and composition of the liquid medium being employed and the like factors.

In a further specific embodiment, the enzyme component/activity regulating component couple is chosen so that the enzyme component is sensitive to being deactivated by a metal component and the activity regulating component comprises this metal component. In this embodiment, the presence of the metal component is often effective to permanently or temporarily deactivate the enzyme component. Whether or not the deactivation can be reversed (or is temporary) depends, among other factors, on the specific enzyme or enzymes being employed. In the case of enzymes which are deactivated by ionic metal components, one can easily determine if this deactivation is permanent, simply by testing for enzymatic activity after the enzyme has been removed from the ionic metal component. Thus, if the deactivated (inactive) enzyme component is removed from the liquid medium containing the ionic metal component and placed into a medium containing a sufficient amount of a metal chelating agent or component, such as ethylene diamine tetraacetic acid or its ophthalmically acceptable salts (referred to collectively as EDTA), the enzyme component may again become active. Of course, if insufficient metal chelating agent is employed, the enzyme component remains inactive.

Since many liquid media used to clean, or otherwise treat, contact lenses include some amount of metal chelating agent, it may be important to use an additional amount of metal component and/or to wait an additional amount of time in order to achieve satisfactory enzyme component deactivation in such liquid media. In addition, by selectively choosing the type and amount of the enzyme component, metal component and metal chelating agent, one can obtain both effective contact lens cleaning and effective enzyme component deactivation with or without a delayed release component.

In a particularly useful embodiment, the metal component-sensitive enzyme component is genetically engineered, for example, using conventional genetic engineering, such as recombinant DNA, techniques, to be sensitive to being deactivated by the ionic metal component. Many enzymes can be genetically modified to be sensitive to metal component deactivation. Examples of such enzymes include trypsin,subtilisin, chymotrypsin and the like and mixtures thereof.

The metal component may be chosen from a wide variety of materials, provided that such component effectively deactivates the enzyme component being employed. Particularly useful examples of metal components include alkaline earth metal components, transition metal components, such as copper components, iron (e.g., $Fe^{+3}$) components, zinc components, magnesium components and the like, and mixtures thereof. Zinc components are particularly useful.

The amount of metal component used should be such as to render the enzyme component inactive enough such that the enzyme-containing solution does not harm the eye. The metal component is preferably present in a form which is soluble after being released into the liquid medium. Some excess of metal component may be usefully employed to facilitate rendering the metal component-sensitive enzyme component inactive. However, large excesses of metal component should be avoided as being wasteful and as being potentially damaging, for example, to the contact lens being treated or to the wearer of the treated contact lens. The metal component should be chosen to be compatible with the present system. Preferably, the metal component is ophthalmically acceptable at the concentrations used in the present invention.

In another specific embodiment, the enzyme component is activated by the presence of a metal. Thus, such a metal-activated enzyme component is present in an amount effective when released in a liquid medium to remove debris from a contact lens located in the liquid medium. The activity regulating component, for example, a metal chelating agent effective to chelate or otherwise render ineffective the metal associated with the metal-activated enzyme component, is present in an amount effective to deactivate, preferably substantially completely deactivate, the metal-activated enzyme component located in the liquid medium over a period of time. This period of time is sufficient to allow the metal-activated enzyme component to effectively remove debris from a contact lens which is introduced into the liquid medium before or at the same time the metal-activated enzyme is released in the liquid medium.

Although any suitable activity regulating component may be employed which is capable of deactivating the metal-activated enzyme component, it is preferred that the activity regulating component comprise a metal chelating component effective over the period of time noted above to chelate, for example, complex and/or otherwise interact with and thereby render permanently or temporarily ineffective, metal ions, such as the metal associated with, for example, the metal needed to activate, the metal-activated enzyme component. Examples of particularly useful metal-activated enzyme components are those selected from alkaline earth metal-activated proteases, preferably calcium-activated proteases.

Examples of metal chelating agents or components which are useful in the present invention as activity regulating components include EDTA. Other ophthalmically acceptable metal chelating components or metal sequestering components, such as certain polyvinyl alcohols, may be employed in the present invention, provided that such other components function as activity regulating components as described herein. Metal chelating components may be employed to slow or, preferably, to control the release of the metal activity regulating components in the liquid medium.

The metal chelating activity regulating component may be released in the liquid medium at the same time the metal-activated enzyme component is released. In this instance, the deactivating (rendering ineffective) of the metal-activated enzyme component is sufficiently slow so that the enzyme component remains active and effective to remove debris from a contact lens for a period of time. Eventually, a sufficient amount of the metal associated with the metal-activated enzyme component is deactivated, preferably substantially completely deactivated.

In another embodiment, the metal-activated enzyme may be present in the liquid medium into which is introduced the contact lens to be cleaned. The activity regulating component can be introduced into this liquid medium at the same time or after the contact lens is introduced into the liquid medium. The activity regulating component does, over time, interact or otherwise affect the metal associated with the metal-activated enzyme component to deactivate, preferably substantially completely deactivate, the enzyme component.

The amount of activity regulating component used in accordance with the present invention to deactivate a metal-activated enzyme component varies widely and depends, for example, on the specific type and amount of metal-activated enzyme component being employed, on the specific activity regulating component being employed, on the amount of time during which the metal-activated enzyme component is to be deactivated after release of the activity regulating component, and the like factors. Excessive amounts of activity regulating components should be avoided since this is wasteful and unnecessary and may have detrimental effects, for example, on the wearer of the cleaned contact lens. The amount of activity regulating component employed is preferably no more than about 200% or about 300% of that amount needed to completely deactivate the metal-activated enzyme component present in the liquid medium.

The enzyme component may be employed in liquid or solid form. The enzyme component may be provided in a solid form such as tablets, pills, granules and the like, which is introduced into a liquid medium.

Additional components may be added to or incorporated into the enzyme component-containing solid and/or the liquid medium. For example, components such as effervescing agents, stabilizers, buffering agents, chelating and/or sequestering agents, coloring agents or indicators, tonicity adjusting agents, surfactants and the like can be employed. In addition, binders, lubricants, carriers, and other excipients normally used in producing tablets may be used when enzyme component-containing tablets are employed.

Effervescing agents are typically employed when the enzyme component is provided in solid form. Examples of suitable effervescing agents include tartaric or citric acid used in combination with a suitable alkali metal salt such as sodium carbonate.

Examples of suitable buffering agents which may be incorporated into an enzyme component-containing tablet or the liquid medium include alkali metal salts such as potassium or sodium carbonates, acetates, borates, phosphates, citrates and hydroxides, and weak acids such as acetic acid and boric acid Preferred buffering agents are alkali metal borates such as sodium borate and potassium borate. Additionally, other pH adjusting agents may be employed, such as inorganic acids. For example, hydrogen chloride may be employed in concentrations suitable for ophthalmic uses. Generally, buffering agents are present in amounts from about 0.01 to about 2.5% (w/v) and preferably, from about 0.2 to about 1.5% (w/v), of the liquid medium.

Examples of preferred metal chelating components include EDTA which is normally employed in amounts from about 0.010 to about 2.0 (w/v). Other metal chelating (or sequestering) components such as certain polyvinyl alcohols can also be employed. Usage of metal (metal ion) chelating components should take under consideration the possible presence of a metal component, for example, metal ions, which may activate the enzyme component or which may inactivate the enzyme component.

Any suitable colorant component and/or indicator component may be included in the present compositions, for example, to indicate the presence and/or the absence of oxidative disinfectants, such as, hydrogen peroxide. A particularly useful indicator component is cyano cobalamine. Of course, other conventional colorant components/indicator components may be employed.

The tonicity adjusting agent which may be a component of the liquid medium and may optionally be incorporated into an enzyme component-containing tablet is employed to adjust the osmotic value of the liquid medium.

Suitable surfactants can be either cationic, anionic, nonionic or amphoteric. Preferred surfactants are neutral or nonionic surfactants which may be present in amounts up to 5% (w/v). Examples of suitable surfactants include polyethylene glycol esters of fatty acids, polyoxypropylene ethers of $C_{12}$–$C_{18}$ alkanes and polyoxyethylene, polyoxypropylene block copolymers of ethylene diamine (e.e., poloxamine).

The binders and lubricants for enzyme tableting purposes and other excipients normally used for producing powders, tablets and the like, may be incorporated into enzyme component-containing tablet formulations.

In a very useful embodiment, the activity regulating component is present in a delayed release form. Thus, the activity regulating component may be introduced into the liquid medium at the same time (and as part of the same item or items which include the enzyme component) as the enzyme component is introduced into the liquid medium. However, the activity regulating component is released in the liquid medium after the enzyme component is so released. The release of the activity regulating component is preferably delayed for a period of time sufficient to allow the released enzyme component to remove, more preferably completely remove, at least one type of debris from a contact lens present in the liquid medium. Such sufficient time is preferably within about 6 hours, for example, in the range of about 1 minute to about 6 hours, more preferably within about 4 hours, for example, in the range of about 2 minutes to about 4 hours.

Although multi-layered (including core and coating layering) tablets or pills are preferred, the delayed release forms of the present compositions can be present in any other suitable item or items, such as masses of powders, granules and the like. Delayed release technology is well known in the art as exemplified by the text *Controlled Drug Delivery,* 2nd Ed., Joseph R. Robinson & Vincent H. L. Lee, Eds., Marcel Dekker, Inc., New York, 1987.

Items which release their ingredients in a sequential, time delayed manner are well known and can be produced using conventional technology. Therefore, a detailed description of such items and such production technology is not presented here.

In one useful embodiment, a direct compression is made of the core tablet formulation using conventional tableting equipment. A solution containing the delayed release component is applied, e.g., sprayed, onto the core tablet using conventional coating equipment, such as film coating pans or fluid beds. Coating pan equipment is available from Driam of West Germany, Thomas Engineering, Vector Corporation, and Key Industries in the U.S. Fluid bed equipment is available from Glatt Air Techniques, Vector Corporation, and Aeromatic, as well as other companies. Using appropriate coating parameters, which are dependent on, for example, the specific composition of the delayed release component-containing solution, the equipment used and core tablet size, an appropriate amount of delayed release component is applied to the core tablet that allows the desired delay release time.

Any suitable delayed release component or combination of delayed release components may be employed, provided that such component or components function as described herein and have no substantial detrimental effect on components used to treat the lens, on the lens being treated and on the human wearing the treated lens. The delayed release component is preferably at least partially, more preferably completely, water soluble. The delayed release component preferably comprises a major amount of at least one polymeric material. Examples of useful delayed release components include, but are not limited to, soluble cellulose ethers such as methylcellulose, methylhydroxypropylcellulose, methylhydroxyethylcellulose, hydroxypropylcellulose, hydroxyethylcellulose and sodium carboxymethylcelluloses; cellulose esters such as cellulose acetate phthalate and hydroxypropylmethylcellulose phthalate; polymers derived from at least one of acrylic acid, acrylic acid esters, methacrylic acid and methacrylic acid esters such as methacrylic acid-methyl methacrylate copolymer (for example that sold by Rohm Pharma under the trademark Eudragit L 100) and methacrylic acid-ethyl acrylate copolymers (for example that sold by Rohm Pharma under the trademark Eudragit L 30D); polymers derived from methyl vinyl ether and maleic acid anhydride; polyvinylpyrrolidone; polyvinyl alcohols and the like and mixtures thereof.

The liquid medium useful in practicing the present invention is preferably aqueous-based. The liquid medium can include a disinfectant component. Such disinfectant component is present in a disinfecting amount, in particular in an amount effective to disinfect a contact lens.

A disinfecting amount of disinfectant component means such amount as reduces the microbial burden to an acceptable level within a reasonable soaking period, such as four hours or less.

The disinfectant component may be oxidative or non-oxidative. Particularly useful oxidative disinfectant components are hydrogen peroxide or one or more other peroxy-containing compounds, for example, one or more other peroxides.

For hydrogen peroxide, a 0.5% (w/v) concentration, for example, in an aqueous liquid medium, is often effective as a disinfectant component. It is preferred to use at least about 1.0% or about 2.0% (w/v) hydrogen peroxide which concentrations reduce the disinfecting time over that of the 0.5% (w/v) peroxide concentration. No upper limit is placed on the amount of hydrogen peroxide which can be used in this invention except as limited in that the disinfectant component should have no substantial detrimental effect on the contact lens being treated or on the eye of the wearer of the treated contact lens. An aqueous solution containing about 3% (w/v) hydrogen peroxide is very useful.

So far as other peroxides are concerned, they should be used in effective disinfecting concentrations.

When an oxidative disinfectant is used in the present invention, a reducing or neutralizing component in an amount sufficient to chemically reduce or neutralize substantially all of the oxidative disinfectant, for example, hydrogen peroxide, present is employed.

Such reducing or neutralizing components are preferably incorporated into the enzyme component-containing tablet. The reducing agent is generally any non-toxic reducing agent. Reducing components include SH (group)-containing water-soluble lower alcohols, organic amines and salts thereof, amino acids and di-or tripeptides, e.g., cysteine hydrochloride ethyl ester, glutathione, homocysteine, carbamoyl cysteine, cysteinylglycine, 2-mercaptopropionic acid, 2-mercaptopropionylglycine, 2-mercaptoethylamine hydrochloride, cysteine, n-acetylcysteine, beta mercaptoethanol, cysteine hydrochloride, dithiothreitol, dithioerythritol, sodium bisulfate, sodium metabisulfite, thio urea, sulfites, pyrosulfites and dithionites such as the alkali metal salts or alkaline earth metal salts of sulfurous acid, pyrosulfurous acid and dithionious acid, e.g., lithium, sodium, calcium and magnesium salts and mixtures thereof. The thiols are preferred, with N-acetylcysteine being particularly useful.

In general, the reducing component is used in amounts in the range of about 0.5% to about 10% (w/v) of the liquid medium.

In one embodiment, all or a portion of the reducing component is replaced by a peroxidase enzyme component, in particular catalase, which acts to catalyze the neutralization or decomposition of the oxidative disinfectant component, such as hydrogen peroxide. Such peroxidase enzyme component is included, for example, in the enzyme component-containing core tablet, in an amount effective to, together with the reducing component, if any, destroy or cause the destruction of all the oxidative disinfectant component present in the liquid medium. Some excess peroxidase enzyme component may be advantageously used to increase the rate at which the oxidative disinfectant component is destroyed.

As used herein, non-oxidative disinfectant components are non-oxidative organic chemicals which derive their antimicrobial activity through a chemical or physiochemical interaction with the microbes or microorganisms. Suitable non-oxidative disinfectant components are those generally employed in ophthalmic applications and include, but are not limited to, quaternary ammonium salts used in ophthalmic applications such as poly[(dimethylimino)-2-butene-1,4-diyl chloride, alpha- [4-tris(2-hydroxyethyl) ammonium-2-butenyl-w-tris(2-hydroxyethyl) ammonium]-dichloride (chemical registry number 75345-27-6, available under the trademark polyquaternium 1® from ONYX Corporation), benzalkonium halides, and biguanides such as salts of alexidine, alexidine-free base, salts of chlorhexidine, hexamethylene biguanides and their polymers, antimicrobial polypeptides, and the like and mixtures thereof.

The salts of alexidine and chlorhexidine can be either organic or inorganic and are typically disinfecting gluconates, nitrates, acetates, phosphates, sulphates, halides and the like. Generally, the hexamethylene biguanide polymers, also referred to as polyaminopropyl biguanide (PAPB), have molecular weights of up to about 100,000. Such compounds are known and are disclosed in U.S. Patent No. 4,758,595.

Another class of disinfectant components which meet the foregoing criteria when detoxified are compounds having the following formula:

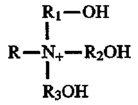

(A)

wherein R is an alkyl or alkenyl group having 12–20 carbon atoms and preferably a myristyl or tallow group, i.e., composed of mixtures of $—C_{14}H_{28}$ and $C_{14}H_{29}$ (myristyl) or $—C_{17}H_{34}$ and $—C_{17}H_{35}$ (tallow); and $R_1$, $R_2$, and $R_3$ are the same or different and represent alkyl groups having 1–3 carbon atoms. This disinfectant component should be used together with a detoxifying amount of a non-toxic component, preferably selected from water soluble polyhydroxyethyl methacrylate, carboxymethylcellulose, non-ionic surfactants such as polyoxyethylene sorbitan fatty acid esters and polyexethylene ethers, polyvinylpyrrolidone, polyvinyl alcohol, hydroxypropylmethylcellulose, and the like and mixtures thereof.

The amount of the detoxifying component which is used in connection with a disinfectant component disinfecting of Formula A varies widely, for example, in the range of about 0.0001 to about 2.0%, preferably about 0.04 to about 0.4%, (w/v) of the liquid medium.

Another class of disinfectant components are the quaternary ammonium substituted polypeptides, such as those which are based on a collagen hydrolysate of relatively low molecular weight. A particularly useful quaternary ammonium substituent is the lauryl trimethyl ammonium chloride group. The quaternary ammonium substituted polypeptides preferably have molecular weights in the range of about 500 to about 5000. One specific example is that sold under the trademark Croquat L by Croda, Inc.

Yet another class of disinfectant components are the ophthalmically acceptable quaternary ammonium polymers selected from ionene polymers containing an oxygen atom covalently bonded to two carbon atoms and mixtures thereof. Such polymers are described in Dziabo et al U.S. Pat. No. 5,145,643 which is incorporated in its entirety by reference herein.

A specific example is poly [oxyethylene (dimethyliminio) ethylene -(dimethyliminio) ethylene dichloride], sold under the trademark WSCP by Buckman Laboratories, Inc.

Other disinfecting agents include dodecyl-dimethyl-(2-phenoxyethyl)-ammonium bromide.

Examples of ophthalmically acceptable anions which may be included in the ionic disinfectant components useful in the present invention include chloride (Cl), bromide, iodide, bisulfate, phosphate, acid phosphate, nitrate, acetate, maleate, fumarate, oxalate, lactate, tartrate, citrate, gluconate, saccharate, p-toluene sulfonate and the like.

The non-oxidative disinfectant components useful in the present invention are preferably present in the liquid medium in concentrations in the range of about 0.00001% to about 0.01% (w/v). The more preferred range for polyquads (e.g., poly-quaternium-1) and biguanides is 0.00005% to about 0.0015% (w/v) and for quaternary ammonium substituted polypeptides (e.g., Croquat L) and polymers (e.g. WSCP) is in the range of about 0.003% to 0.015% (w/v).

More preferably the agent is present in the working solution at an ophthalmically safe concentration such that the user can rinse the lens with the solution and thereafter directly place the lens in the eye.

For purposes of the present invention an aqueous solution containing about 0.00001% to about 0.005% (w/v) of a non-oxidative disinfectant component may be used as a multipurpose solution. That is, the solution (liquid medium) can be used for disinfection; cleaning (together with the enzyme component), storage and rinsing. Thus, by using the methodology of the present invention, the user only needs to have the enzyme component/deactivator component couple, for example, in the form of a delayed release tablet, and a single solution, the multi-purpose solution noted above or a single multi-purpose solution which contains an acid-acting protease which is neutralized by tears or fluids in the eye. There is no longer a need to rub and rinse the cleaned lens or to use a separate saline solution.

During practice of this invention, the enzyme component/deactivator component formulation is in a liquid medium, typically about 1 to about 10 ml. The liquid medium may be isotonic, hypotonic or hypertonic, and may include an effective amount of a disinfectant component. The contact lens to be treated is preferably introduced into the liquid medium at the same time the above-noted formulation is so introduced if the enzyme is not already present in the liquid medium. The contact lens/liquid medium contacting occurs at conditions effective to obtain the desired beneficial contact lens care result or results, for example, cleaning of the contact lens or cleaning and disinfecting of the contact lens. If the liquid medium is aqueous-based, as is preferred, contacting temperatures in the range of about 0° C. to about 100° C. are preferred, with temperatures in the range of about 10° C. to about 60° C. being more preferred and temperatures in the range of about 15° C. to about 40° C. being still more preferred. Contact lens/liquid medium contacting at ambient temperature is very convenient and useful. Typically, the cleaning contacting takes less than about eight hours, with about 1 to about 6 hours being preferred.

Preferably, the lens is removed from the liquid medium and placed directly into the eye without the need for separate rubbing and rinsing steps. Alternately, the lens can be rinsed with a buffered saline solution, or with a liquid medium having the same composition as that used above (without enzyme), prior to insertion into the eye.

It is most convenient to formulate the enzyme component, deactivator component and other dry components as a powder or tablet structured for delayed or sequential release of components, as described herein. The contact lens may already be in the liquid medium when the enzyme component/deactivator component is introduced.

The following non limiting examples illustrate certain embodiments of the present invention.

EXAMPLE 1

A layered tablet is prepared using conventional techniques and has the following composition:

| | |
|---|---|
| Core | |
| Crystalline catalase | 520 activity units |
| Cyano cobalamine | 0.085 mg |
| Polyethylene glycol 3350 | 1.05 mg |
| Sodium chloride | 89.4 mg |
| Sodium phosphate dibasic (anhydrous) | 12.5 mg |
| Sodium phosphate monobasic monohydrate | 1.0 mg |
| Zinc sulfate | 5.0 mg |
| Core Coating | |
| Hydroxypropylmethylcellulose | 5.0 mg |
| Outer Layer | |
| Subtilisin A | 0.0075 Anson Units |

This tablet is introduced into 10 ml of a conventional aqueous solution containing 3% (w/v) of hydrogen peroxide. A debris laden contact lens is introduced into the solution at the same time. Very quickly, the Subtilisin A enzyme is released into the solution and effectively removes debris from the contact lens. The hydrogen peroxide in the solution also effectively disinfects the contact lens. After about 40 minutes, the core is released in the solution. The catalase in the core is effective to cause the destruction of all the hydrogen peroxide in the solution. Zinc ions formed from the zinc sulfate present in the core are effective to substantially completely inactivate the Subtilisin A.

The cleaned and disinfected contact lens can be removed from the solution and placed directly in the eye for safe and comfortable wear. Alternately, the cleaned and disinfected contact lens can be rinsed with a conventional buffered saline solution before being placed in the eye for safe and comfortable wear.

EXAMPLE 2

A layered tablet is prepared using conventional techniques and has the following composition:

| | |
|---|---|
| Core | |
| Conventional sugar-based filler (Di-Pac) | 40 mg |
| Polyvinylpyrrolidone | 4 mg |
| Polyethylene glycol 3350 | 4 mg |
| Zinc sulfate | 1.8 mg |
| Core Coating | |
| Hydroxypropylmethylcellulose | 2 mg |
| Outer Layer | |
| Subtilisin A | .0017 Anson Units |

-continued

| The following solution is prepared: | |
|---|---|
| Polyaminopropyl biguanide, w/v % | 0.0001 |
| Disodium ethylene diamine tetraacetate (EDTA), w/v % | 0.05 |
| Sodium chloride, w/v % | 0.37 |
| TRIS[1], w/v % | 1.2 |
| Nonionic surfactant[2], w/v % | 0.025 |
| Purified water, USP | QS |

[1]Tromethamine, otherwise known as 2-amino-2-hydroxy methyl-1,3-propanediol

[2]A nonionic surfactant containing oxyethylated tertiary octylphenol formaldehyde polymer and sold under the trademark Tyloxapol by Ruger.

Hydrochloric acid is added to the solution to give a pH of about 7.5.

The above-noted tablet and a debris laden contact lens (in a lens holder) are introduced into 1.8 ml of the above-noted solution at the same time. Upon being introduced into the solution, the Subtilisin A is quickly released in the solution and effectively removes debris from the contact lens. In addition, the contact lens is being effectively disinfected by the solution. After about 1 hour, the core is released in the solution. Note that the final solution contains a molar concentration of zinc sulfate which is well in excess, for example, on the order of about 4 times, the molar concentration of disodium ethylene diamine tetraacetate. This molar excess of zinc sulfate insures that the solution in which the zinc sulfate is released contains a sufficient amount of free (unchelated) zinc ions to substantially inactivate the Subtilisin A enzyme. Zinc ions formed from the zinc sulfate present in the core are effective to substantially inactivate the Subtilisin A. The contact lens is left in the solution for an additional 3 hours to complete disinfecting the lens.

The cleaned and disinfected contact lens can be removed from the composition and placed directly in the eye for safe and comfortable wear. Alternately, the cleaned and disinfected contact lens can be rinsed with a conventional buffered saline solution or the above polyaminopropyl biguanide-containing solution before being placed in the eye for safe and comfortable wear.

EXAMPLE 3

Tablets are prepared, using conventional techniques, which have the following composition:

| | |
|---|---|
| Conventional sugar-based filler (Di-Pac) | 40.0 mg |
| Polyvinylpyrrolidone (Kollidon 30) | 4.0 mg |
| Polyethylene glycol 3350 | 4.0 mg |
| Subtilisin A MG 1.5 | 1.3 mg* |

*Equal to .0017 Anson units enzymatic activity per tablet.

Four (4) Subtilisin A enzyme solutions are prepared, each utilizing one of the above tablets and 1.8 ml of the polyaminopropyl biguanide-containing solution described in Example 2. Different amounts of $ZnSO_4$ are added to three of the solutions at the same time as the enzyme tablet.

The four solutions include the following components:

| Solution 1 | Solution 2 | Solution 3 | Solution 4 |
|---|---|---|---|
| 1 Tablet | 1 Tablet | 1 Tablet | 1 Tablet |
| 1.8 ml solu. | 1.8 ml solu. | 1.8 ml solu. | 1.8 ml solu. |
| 0 mg $ZnSO_4$ | 0.90 mg $ZnSO_4$ | 1.8 mg $ZnSO_4$ | 4.5 mg $ZnSO_4$ |

Thirty two (32) commercially available soft (55% water content) contact lenses are coated with heat-denatured lysozyme for contact lens cleaning tests as per the method in Huth et al U.S. Pat. No. Reissue 32,672, the disclosure of which is incorporated in its entirety herein by reference.

The lenses are then placed in the test solutions, eight (8) lenses per test solution. The lenses are soaked for 2, 4, 8 and 20 hours. For each time interval, two lenses from each test solution are examined under a microscope to determine the extent of protein removal. The percent cleaning equals the percent of the surface not covered by a protein film at 100 times magnification. The test solutions are measured for their enzymatic activity according to the Azocoll method, Tomarelli, R. M., et al, J. Lab Clin. Med., 34, 428 (1949).

The cleaning and enzyme inactivation results are presented in Table 1.

TABLE 1

| Soaking Time | | Solution 1 | Solution 2 | Solution 3 | Solution 4 |
|---|---|---|---|---|---|
| | $ZnSO_4$ (w/v %) | 0 | 0.05 | 0.1 | 0.25 |
| 15 min | % cleaning | Not tested | Not tested | Not tested | Not tested |
| | % enzyme in activation | 0 | 11 | 34 | 67 |
| 2 hours | % cleaning | 0 | 0 | 0 | 0 |
| | % enzyme inactivation | 0 | 27 | 36 | 82 |
| 4 hours | % cleaning | 20 | 20 | 10 | 0 |
| | % enzyme inactivation | 0 | 75 | No data | 88 |
| 8 hours | % cleaning | 60 | 40 | 40 | 0 |
| | % enzyme inactivation | Not tested | Not tested | Not tested | Not tested |
| 20 hours | % cleaning | 100 | 90 | 50 | 0 |
| | % enzyme inactivation | Not tested | Not tested | Not tested | Not tested |

The results show the following:

(1) Substantial cleaning and enzyme inactivation can be achieved simultaneously. Solution 2 is 75% inactive at 4 hours and yet demonstrates acceptable cleaning in comparison to Solution 1 which does not contain any zinc sulfate.

(2) Increasing concentrations of zinc sulfate result in increasing inactivation of Subtilisin A in a shortened time frame.

(3) Zinc sulfate can inactivate Subtilisin A in the presence of EDTA. An amount of zinc sulfate equal to 0.25 w/v % (Solution 4) is sufficient to eliminate all cleaning in Solution 4 which contains about 0.05 w/v % EDTA.

EXAMPLE 4

A layered tablet is prepared using conventional techniques and has the following composition:

| Core | |
|---|---|
| Crystalline catalase | 520 activity units |
| Cyano cobalamine | 0.085 mg |
| Polyethylene glycol (mol. wt. 3350) | 1.05 mg |
| Sodium Chloride | 89.4 mg |
| Sodium phosphate dibasic (anhydrous) | 12.5 mg |
| Sodium phosphate monobasic monohydrate | 1.0 mg |
| Core Coating | |
| Hydroxypropylmethylcellulose | 5.0 mg |
| Outer Layer | |
| Aspergillo peptidase A(1) | 0.0075 Anson Units |

(1)Acid protease derived from *Aspergillus saitoi*. Other acid proteases, for example, other fungal acid proteases, can be employed instead. Also, genetically engineered acid acting enzymes having activities and activity/pH profiles equivalent to Aspergillo peptidase A can be used instead. Routine experimentation can be employed to determine if any particular acid acting enzyme is effective. For example, the activity of an enzyme can be monitored at various pH levels to determine the usefulness of the enzyme in this embodiment.

This tablet is introduced into 10 ml of a conventional aqueous solution containing 3% (w/v) of hydrogen peroxide. A debris laden contact lens is introduced into the solution at the same time. Very quickly the Aspergillo peptidase A enzyme is released in the solution, which has a pH of 3.5, and effectively removes debris from the contact lens. The hydrogen peroxide in the solution also effectively disinfects the contact lens. After about 40 minutes, the core is released in the solution. The pH of the solution is increased to 7.0. This change in the pH inactivates the Aspergillo peptidase A enzyme. The phosphate buffers in the core tablet are released after the Aspergillo peptidase A enzyme effectively cleans the contact lens The catalase in the core is effective to cause the destruction of all the hydrogen peroxide in the solution.

The cleaned and disinfected contact lens can be removed from the solution and placed directly in the eye for safe and comfortable wear. Alternately, the cleaned and disinfected contact lens can be rinsed with a conventional buffered saline solution before being placed in the eye for safe and comfortable wear.

EXAMPLE 5

The following solution is prepared:

| | |
|---|---|
| Polyaminopropyl biguanide, w/v % | 0.0001 |
| Disodium ethylene diamine tetraacetate, w/v % | 0.05 |
| Sodium chloride | Sufficient to provide a hypotonic solution having an osmolality less than about 290 mOsmol/kg |
| Penicillo pepsin | 0.0012 Anson Units/ml |
| Buffer | Sufficient to maintain pH of solution at 4(1) |
| Nonionic surfactant,(2) w/v % | 0.025 |
| Purified water, USP | QS |

(1)The buffer and/or amount of buffer should be selected to maintain the solution weakly buffered at a pH of 4. Such buffering should have no substantial effect if small (residual) amounts of the solution are placed in another liquid medium, for example, in the tear fluid on a human eye. Examples of useful buffers include citric acid-disodium hydrogen phosphate, acetic acid-sodium acetate, succinic acid-sodium hydroxide and the like.
(2)Same as the nonionic surfactant described in Example 2.

A debris laden, soft (hydrogel) contact lens, in a lens holder, is placed in 1.8 ml of the above-noted solution. The acid protease (Penicillo pepsin) effectively removes debris from the contact lens. In addition, the contact lens is being effectively disinfected by the solution. The configuration (size) of the contact lens is maintained throughout this contacting. That is, the low pH of the solution tends to de-swell the hydrogel contact lens, while the hypotonicity of the solution tends to swell the lens. The balance between the low pH and hypotonicity of the solution acts to maintain the water content of the hydrogel contact lens at substantially its value prior to contacting with the solution.

After at least 4 hours (or overnight), the cleaned and disinfected contact lens is removed from the solution and placed directly into the eye for safe and comfortable wear. In placing the contact lens directly from the acid solution into the eye, the lens very quickly, for example, in about 1 to about 2 minutes, becomes stabilized at a physiological pH of about 7 to 7.5. At this pH, the acid protease, Penicillo pepsin, is inactivated and does not harm the eye. This embodiment of the present invention is a very effective one step, one solution approach to cleaning and disinfecting contact lenses.

One important feature of the present invention, particularly when soft hydrogel contact lenses are being treated, is a system which is balanced so as to substantially maintain the initial configuration (size) of the contact lens, that is to substantially maintain the water content of the contact lens, throughout the contacting. As noted above, in Example 5, this deswelling/swelling balance can be achieved using a hypotonic solution in combination with an acid pH. An alternative for use in combination with an acid pH is to employ one or more other solutes, such as osmolytes which tend to swell the lens, thereby balancing or countering the lens deswelling effect of the low pH.

EXAMPLE 6

A tablet is prepared, using conventional techniques, containing 0.0017 Anson Units of a calcium activated neutral protease, such as thermolysin.

The tablet and a debris laden contact lens (in a lens holder) are introduced into 1.8 ml of the solution identified in Example 2. Quickly after being introduced into this solution, the calcium activated neutral protease is released in the solution and effectively removes debris from the contact lens. In addition, the contact lens is being effectively disinfected by the solution. Over time, the disodium ethylene diamine tetraacetate in the solution chelates an increasingly large amount of the calcium associated with the enzyme. This chelating (or complexing) effectively inactivates the enzyme. After about 4 to about 8 yours, the contact lens is effectively cleaned and disinfected, and the enzyme is substantially inactivated.

The cleaned and disinfected lens can be removed from the composition and placed directly in the eye for safe and comfortable wear. Alternately, the cleaned and disinfected contact lens can be rinsed with a conventional buffered saline solution or a solution such as in Example 2 before being placed in the eye for safe and comfortable wear.

EXAMPLE 7

A layered tablet is prepared using conventional techniques and has the following composition:

| | |
|---|---|
| Core | |
| Conventional sugar-based filler (Di-Pac) | 40 mg |
| Polyvinylpyrrolidone | 4 mg |
| Polyethylene glycol 3350 | 4 mg |
| Disodium ethylene diamine tetraacetate | 2 mg |
| Core Coating | |
| Hydroxypropyl methylcellulose | 2 mg |
| Outer Layer | |
| Calcium activated neutral protease | 0.0017 Anson Units |

A solution is prepared similar to that described in Example 2 except the solution contains no disodium ethylene diamine tetraacetate.

The tablet and a debris laden contact lens (in a lens holder) are introduced into 1.8 ml of the above-noted solution at the same time. Quickly after being introduced into the above-noted solution, the calcium activated neutral protease is released in the solution and effectively removes debris from the contact lens. In addition, the contact lens is being effectively disinfected by the solution. After about 1 hour, the core is released in the solution. The disodium ethylene diamine tetraacetate present in the core is effective to chelate the calcium associated with the calcium activated neutral protease to substantially inactivate this enzyme. The contact lens is left in the solution for an additional 3 hours to complete disinfecting the lens.

The cleaned and disinfected contact lens can be removed from the composition and placed directly in the eye for safe and comfortable wear. Alternately, the cleaned and disinfected contact lens can be rinsed with a conventional buffered saline solution or a solution such as in Example 2 before being placed in the eye for safe and comfortable wear.

While this invention has been described with respect to various specific examples and embodiments, it is to be understood that the invention is not limited thereto and that it can be variously practiced within the scope of the following claims.

What is claimed is:

1. A method for cleaning a contact lens comprising:

contacting a contact lens in a liquid medium containing an acid acting enzyme component in an amount effective to remove debris from a contact lens located in said liquid medium, said liquid medium being weakly buffered at an acidic pH at which said acid acting enzyme component is active;

removing said contact lens from said liquid medium; and directly placing said contact liens into an eye.

2. The method of claim 1 wherein said liquid medium is an aqueous liquid medium.

3. The method of claim 1 wherein said liquid medium includes an effective amount of a buffer component selected from the group consisting of citric acid-disodium hydrogen phosphate, acetic acid-sodium acetate and succinic acid-sodium hydroxide.

4. The method of claim 1 wherein said liquid medium includes an effective amount of a surfactant component.

5. The method of claim 1 wherein said surfactant component is nonionic.

6. The method of claim 1 wherein said acid acting enzyme component is selected from the group consisting of acid proteases.

7. The method of claim 1 wherein a residual amount of said liquid medium is directly placed into the eye together with said contact lens, the buffering of said residual amount of said liquid medium being substantially ineffective in the eye.

8. The method of claim 1 wherein said liquid medium includes an effective amount of a disinfectant component and said contacting is effective to disinfect the contact lens.

9. The method of claim 8 wherein said disinfectant component is non-oxidative.

10. The method of claim 1 wherein said contact lens comprises a hydrogel and the conditions present in said liquid medium are effective to substantially maintain the water content of said contact lens.

11. The method of claim 10 wherein said liquid medium is an aqueous liquid medium.

12. The method of claim 11 wherein said aqueous liquid medium includes a solute component in an amount effective to counter the lens deswelling effect of said acidic pH.

13. The method of claim 12 wherein said solute component is selected from the group consisting of osmolytes which tend to swell the contact lens.

14. The method of claim 11 wherein said aqueous liquid medium is hypotonic.

15. The method of claim 14 wherein said liquid aqueous medium has an osmolality less than about 290 mOsmol/kg.

* * * * *